United States Patent
Croxford et al.

(10) Patent No.: US 11,062,121 B2
(45) Date of Patent: Jul. 13, 2021

(54) DATA PROCESSING

(71) Applicants: Apical Limited, Cambridge (GB); Arm Limited, Cambridge (GB)

(72) Inventors: Daren Croxford, Cambridge (GB); Zhi Feng Lee, Penang (MY)

(73) Assignees: Apical Limited, Cambridge (GB); Arm Limited, Cambridge (GB)

(*) Notice: Subject to any disclaimer, the term of this patent is extended or adjusted under 35 U.S.C. 154(b) by 97 days.

(21) Appl. No.: 16/446,308

(22) Filed: Jun. 19, 2019

(65) Prior Publication Data
US 2019/0392194 A1    Dec. 26, 2019

(30) Foreign Application Priority Data
Jun. 22, 2018 (GB) ..................... 1810306

(51) Int. Cl.
*G06K 9/00* (2006.01)
*G06F 17/15* (2006.01)
*G06K 9/62* (2006.01)
*G06N 3/04* (2006.01)

(52) U.S. Cl.
CPC ......... *G06K 9/00201* (2013.01); *G06F 17/15* (2013.01); *G06K 9/628* (2013.01); *G06N 3/04* (2013.01)

(58) Field of Classification Search
CPC ...... G06K 9/00201; G06K 9/628; G06N 3/04; G06F 17/15
See application file for complete search history.

(56) References Cited

U.S. PATENT DOCUMENTS

| | | | |
|---|---|---|---|
| 8,345,921 B1 | 1/2013 | Frome et al. | |
| 10,242,294 B2* | 3/2019 | Eldar | ...... G06T 7/187 |
| 10,498,973 B1* | 12/2019 | Zavesky | ...... H04N 5/262 |
| 10,798,313 B2* | 10/2020 | Hutz | ...... G06K 9/00375 |
| 2008/0155540 A1* | 6/2008 | Mock | ...... G06Q 10/063112 |
| | | | 718/100 |
| 2016/0269376 A1* | 9/2016 | Goyal | ...... G02B 27/017 |
| 2017/0309108 A1* | 10/2017 | Sadovsky | ...... G07D 7/206 |
| 2019/0068895 A1* | 2/2019 | Hutz | ...... G06K 9/00375 |

FOREIGN PATENT DOCUMENTS

WO    2013019262 A1    2/2013

OTHER PUBLICATIONS

United Kingdom Combined Search and Examination Report dated Dec. 19, 2018 for Application No. GB1810306.9.

* cited by examiner

*Primary Examiner* — Kim Y Vu
*Assistant Examiner* — Molly Delaney
(74) *Attorney, Agent, or Firm* — EIP US LLP (57) ABSTRACT

A method of data processing for an object identification system comprising a neural network. The method comprises, in a secure environment, obtaining first sensed data representative of a physical quantity measured by a sensor. The first sensed data is processed, using the neural network in the secure environment, to identify an object in the first sensed data. The method includes determining that the identified object belongs to a predetermined class of objects. In response to the determining, a first portion of the first sensed data is classified as data to be secured, and a second portion of the first sensed data is classified as data which is not to be secured. The second sensed data, derived from at least the second portion, is outputted as non-secure data.

19 Claims, 5 Drawing Sheets

DATA PROCESSING

CROSS REFERENCE TO RELATED APPLICATION

This application claims the benefit under 35 U.S.C. § 119(a) and 37 CFR § 1.55 to United Kingdom patent application no. GB1810306.9, filed on Jun. 22, 2018, the entire content of which is incorporated herein by reference.

BACKGROUND

Technical Field

The present disclosure relates to methods and apparatus for processing data.

Background

Sensed data representative of a physical quantity measured by a sensor, such as image data representative of an image, may be processed to detect characteristics of the sensed data. For example, image data may be processed to detect objects in the image. The sensed data, for example the image, may contain sensitive information; the loss, misuse, or modification thereof, or unauthorised access thereto, may adversely affect the privacy, welfare or security of an individual or organisation. It is therefore desirable to improve data processing methods for seeking to protect such sensitive information.

SUMMARY

In a first embodiment, there is provided a method of data processing for an object identification system comprising a neural network, the method comprising, in a secure environment: obtaining first sensed data representative of a physical quantity measured by a sensor; processing the first sensed data, using the neural network, to identify an object in the first sensed data; determining that the identified object belongs to a predetermined class of objects; in response to the determining, classifying a first portion of the first sensed data as data to be secured with at least one security feature, and a second portion of the first sensed data to which said at least one security feature is not to be applied; and outputting second sensed data, derived from at least the second portion, as non-secure data.

In second embodiment, there is provided an object identification system, comprising a neural network, configured to perform secure data processing operations including: obtaining first sensed data representative of a physical quantity measured by a sensor; processing the first sensed data, using a neural network, to identify an object in the first sensed data; determining that the identified object belongs to a predetermined class of objects; in response to the determining, classifying a first portion of the first sensed data as data to be secured with at least one security feature, and a second portion of the first sensed data to which said at least one security feature is not to be applied; and outputting second sensed data, derived from at least the second portion, as non-secure data.

Further features and advantages will become apparent from the following description of examples which is made with reference to the accompanying drawings.

DETAILED DESCRIPTION

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Systems and methods relating to processing sensed data, representative of a physical quantity measured by a sensor, are described herein. A sensor may be a device configured to measure a physical quantity, such as light or sound, and convert it into a signal, e.g. an electrical signal. Examples of sensors include image sensors and microphones. For example, an image sensor may convert light into a digital signal. The sensed data associated with an image sensor may therefore be image data representative of an image captured by the sensor. Examples described below with reference to the Figures relate to processing image data. However, in other examples the sensed data may be audio data representative of sound (e.g. measured by a microphone), or another kind of sensed data representative of a different physical quantity, e.g. measured by a different kind of sensor.

Figure 1:
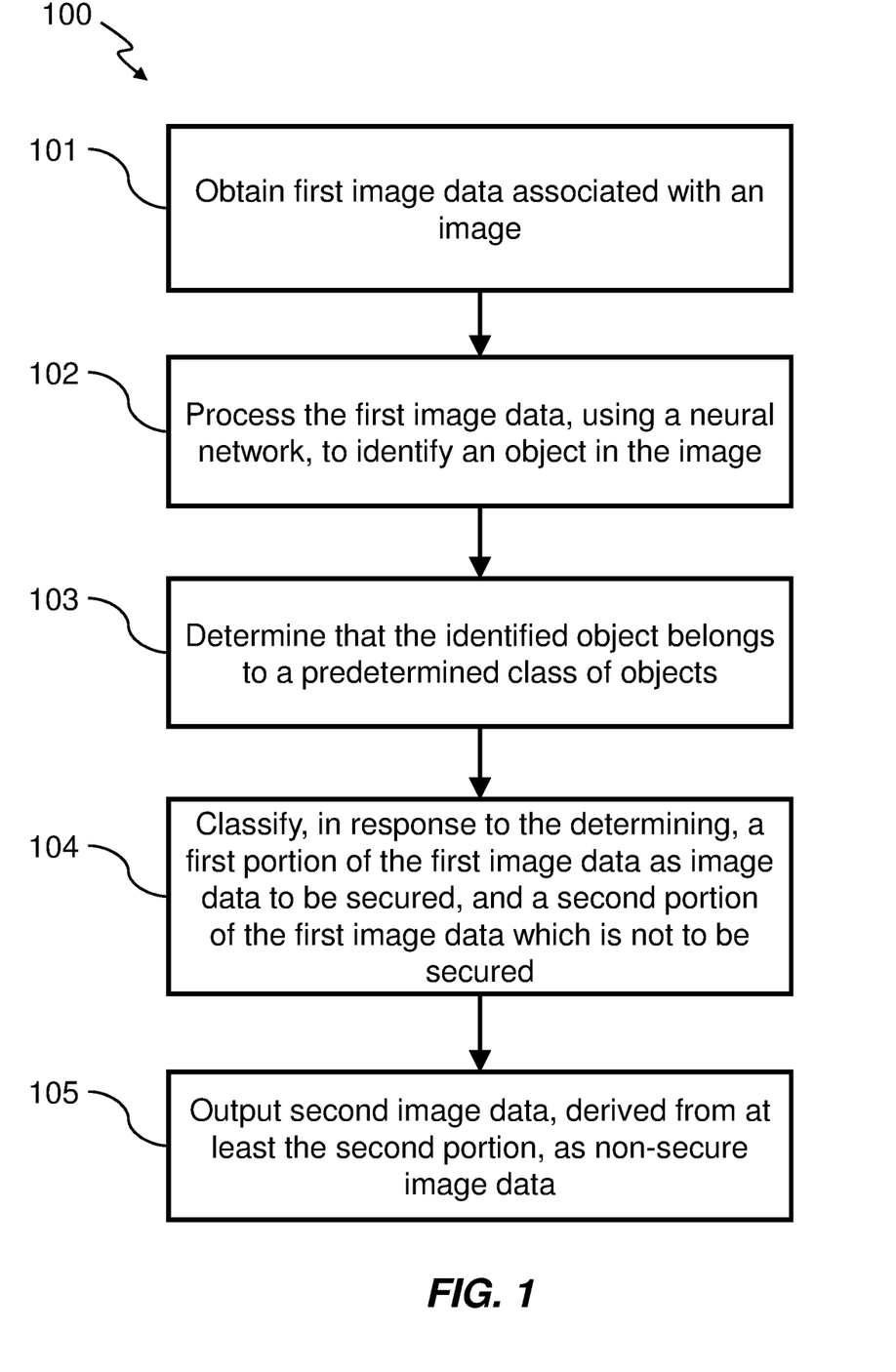
FIG. 1 shows a flow diagram illustrating a method of image processing for an object identification system, comprising a neural network, according to examples.

FIG. 1 is a flow diagram showing a method 100 of image processing for an object identification system comprising a neural network, according to examples. An object identification system, sometimes known as an object detection system or object classification system, for example, allows objects belonging to a particular class of objects to be detected in the image. For example, where the class is human faces, the object identification system may be used to detect the presence of a human face in the image. In some cases, an object identification system allows particular instances of the object to be identified. For example, the instance may be a particular human face. In this example, the object identification system may therefore be used to identify that a detected human face is the particular human face the object identification system is arranged to identify. The image processing method 100 of FIG. 1 may be implemented by an object identification system such as that illustrated schematically in FIG. 2 as part of an image processing system (described below).

A neural network typically includes a number of interconnected nodes, which may be referred to as artificial neurons, or neurons. The internal state of a neuron (sometimes referred to as an "activation" of the neuron) typically depends on an input received by the neuron. The output of the neuron may then depend on the input, weight, bias, and the activation function. The output of some neurons may be connected to the input of other neurons, forming a directed, weighted graph in which vertices (corresponding to neurons) or edges (corresponding to connections) of the graph are associated with weights, respectively. The neurons may be arranged in layers such that information may flow from a given neuron in one layer to one or more neurons in a successive layer of the neural network. Examples of neural network architecture are described in more detail below.

The method involves implementing items 101 to 105, shown in FIG. 1, in a secure environment. For example, the secure environment may include a trusted execution environment. The secure environment may be implemented on the object identification system using the TrustZone® technology developed by Arm Limited of Cambridge, UK for example, which provides mechanisms for enforcing security boundaries in a data processing apparatus such as an image processing system. In essence, components within the secure environment (or "secure domain") are trusted within an image processing system (e.g. comprising the object identification system) and therefore are allowed access to security-sensitive data, e.g. within the image processing system, whilst components outside the secure environment (e.g. in a "non-secure domain") are not allowed access to such security-sensitive data. For example, components in the secure environment may have access to certain storage, e.g. secure or "protected" memory regions, which are not accessible to components and systems outside of the secure environment. For example, components and devices performing non-secure operations, e.g. non-secure image processing operations, should be prevented from accessing any storage, e.g. region of memory, which is defined as being secure. Components within the secure environment, e.g. which may perform secure image processing operations, may however access at least some (and in certain cases all) of the secure storage. Certain storage, e.g. non-secure storage, may exist outside of the secure environment, to which components outside of the secure environment, e.g. in a non-secure environment, may access. In some cases, components within the secure environment may also access such non-secure storage, e.g. in addition to any access to secure storage. For example, a storage device may be divided into a secure region and a non-secure region. Components within the secure environment may access both regions, whereas components outside of the secure environment may only access the non-secure region. As described above, such divisions and access controls may be implemented using an embedded hardware technology such as TrustZone® by Arm®.

At item 101 of the method 100, first image data associated with an image is obtained. In some cases, the first image data is representative of the image, for example. In other examples, the first image data is derived from image data representative of the image, as described in examples below.

Item 102 of the method 100 involves processing the first image data, using the neural network, to identify an object in the image. For example, the neural network may be configured to determine whether an object belonging to one or more predetermined classes of objects is present in the image corresponding to the first image data.

Item 103 involves determining that the identified object belongs to a predetermined class of objects. For example, the neural network may be configured to identify credit cards in images. Thus, the predetermined class of objects may be 'credit cards', and the neural network may be configured to determine whether an object belonging to the class, i.e. a credit card, is present in the image, for example.

At item 103 the neural network determines that an object belonging to the predetermined class, e.g. a credit card, is present in the image.

At item 104, and in response to the determining that the identified object belongs to a predetermined class of objects, a first portion of the first image data is classified as image data to be secured with at least one security feature, and a second portion of the first image data is classified as image data to which said at least one security feature is not to be applied. For example, in the example in which the predetermined class of objects is 'credit cards' a first portion of the first image data, corresponding the identified credit card in the image, may be classified as image data to be secured. The rest of the image, determined to not contain an object belonging to the predetermined class, e.g. a credit card, may be classified as the second portion, for example not to be secured with the at least one security feature. In some examples, there is a plurality of predetermined classes of objects. One or more of the plurality of predetermined classes of objects may form a subset of classes such that the method 100 (at item 104) involves classifying a first portion of the first image data as image data to be secured with the at least one security feature, and a second portion of the first image data not to be secured with the at least one security feature, in response to determining that the identified object belongs to one of the subset of classes.

The at least one security feature may be applied in accordance with the implemented secure environment. Applying the at least one security feature to data may retain the data within the secure environment, for example, whereas not applying the at least one security feature may allow the data to be released from the secure environment. In some examples, data to be secured (e.g. the first image data) is marked as such, e.g. using metadata, so that only certain components with a certain level of access can access the secure data. For example, a bit field or 'flag' associated with the data to be secured may be set such that access thereto is restricted based on components having the appropriate access rights (e.g. a corresponding flag). Thus, in such cases, applying the at least one security feature to the first portion of the first image data may include setting a data value corresponding to the first portion of the first image data which restricts access thereto. The data value may be a value of a flag or other data (e.g. metadata) corresponding to the first portion of the first image data.

As an example, the first portion of the first image data may be flagged as secure by setting a value of a security flag associated therewith. For example, the associated security flag may be set to a predetermined value (e.g. to a value of '1' indicating that the data is secure, rather than a value of '0' which indicates that the data is non-secure). Thereafter, the secure image data may only be stored in storage that is correspondingly flagged as secure, and/or may only be accessed by components, e.g. processors, which have access rights to secure data (and/or secure storage). Components may be flagged as secure, in this example, by also setting a value of a respective security flag associated therewith (e.g. to a value of '1' indicating that the component is secure) in a similar way to flagging the image data as secure. Thus, the first portion of the first image data may only be stored to, and/or accessed by, secure components whereas the non-secure second image data (derived from at least the second portion), e.g. having a corresponding security flag value of '0', may be stored to, and/or accessed by, non-secure components. In examples, storage and/or processing of the non-secure second image data by secure components may be restricted. For example, non-secure image data may be not be storable in secure storage and/or processable by a secure processor. The secure environment may implement rules, e.g. such that components may only access data having the same security flag value. For example, a secure processor (e.g. having an associated security flag value of '1') may access secure data (e.g. having an associated security flag value of '1') but not non-secure data (e.g. having an associated security flag value of '0' or no security flag). In other rule examples, secure components may access secure and non-secure storage or data (e.g. having a respective associated flag value of '1' or '0'), as described above. Setting the security flag values and controlling the access rights in such examples may be implemented using the TrustZone® technology referenced above, for example. Other technologies may be used to implement the secure environment and/or apply the at least one security feature in other examples. Furthermore, other types of security feature may additionally or alternatively be applied in other examples, e.g. in accordance with a technology used to implement the secure environment.

Item 105 of the method 100 involves outputting second image data, derived from at least the second portion, as non-secure image data. Non-secure image data may comprise image data to which the at least one security feature has not been applied, e.g. in accordance with the implemented secure environment, as described above. For example, outputting the second image data as non-secure image data may involve writing the second image data to non-secure storage (e.g. a storage component to which the at least one security feature has not been applied and which is therefore not within the secure environment). Additionally or alternatively, the second image data may be output to a non-secure domain for further processing. For example, the non-secure domain may be implemented using different hardware and/or with different security protocols than the secure environment in which the method 100 is implemented, as described above. In certain cases, the method 100 is implemented by an object identification system on a remote device, e.g. which captures the first image data using an image sensor on the remote device, and the second image data is output from the remote device to a computing device (e.g. a server) via a network communicatively coupling the remote device and the computing device. The computing device, e.g. implemented by third party software, may control further processing of the second image data.

In some examples, the second image data comprises the second portion of the first image data. In the example above, the 'credit card' class may have been set as the predetermined class of objects so that the parts of an image that are determined to not contain a credit card can be released from the object identification system as non-secure data, e.g. into a non-secure domain. Other examples of the predetermined class of objects may correspond to other objects which contain private or sensitive information such as identity documents, e.g. passports, or human faces, e.g. of children. In some examples, the predetermined class of objects may correspond to an object which may comprise information, the authenticity of which is to be kept secure. For example, the predetermined class of objects may relate to traffic signs, e.g. speed limit signs, which contain traffic information to be kept secure, e.g. speed limit information. The object identification system may be coupled to or form part an on-board computer device which coupled to or mounted within a road vehicle in such cases, for example.

In examples, the second image data comprises a modified version of the first image data, with the first portion being obfuscated in the modified version. For example, classifying the first portion of the first image data as image data to be secured may involve, as part of the described method 100, determining a location of the identified object in the image. The first portion may then be defined on the basis of the determined location. For example, the first portion may contain the identified object in some examples, such that the entire object is to be obfuscated as part of the first portion. In other examples, the first portion may comprise part of the object, e.g. a certain part of a credit card comprising alphanumeric characters, such that only said part of the object is to be obfuscated in the modified version.

In some examples, the first image data is further processed to determine the location of the identified object in the image, after processing the first image data using the neural network to identify the object in the image. In other examples, the processing to determine the location of the identified object in the image may be performed as part of, or simultaneously to, the processing of the first image data to identify the object in the image.

Obfuscating the first portion, e.g. in the modified version of the first image data, may involve at least one of blurring, obscuring, and redacting the first portion for example. Other types of obfuscation of the first portion are possible. In general, the first image data may be modified to alter the appearance of the first portion in the second image data which is output as non-secure image data. For example, pixel values corresponding to the first portion may be altered to obfuscate the first portion when the second image data is displayed, e.g. on a display device. In this way, the first portion may be unintelligible when the second image data is displayed. This allows the second image data to be used, e.g. displayed or further processed, as non-secure data without the original first portion of the first image data (corresponding to the object belonging to the predetermined class) being released from the secure environment. Thus, for example, a modified version of an image containing a credit card, with the alphanumeric information on the credit card (such as the credit card number) obfuscated, can be further processed outside of the secure environment, e.g. to detect objects belonging to other classes. For example, the credit card may be resting on a surface in the image, and the further processing may be configured to detect such a surface in the image (e.g. for augmenting the image with a virtual object). Thus, it is possible allow for further use of an image comprising a given type of object, e.g. a credit card, to be made outside of the secure environment while not releasing therefrom the particular information associated with the given type of object. The particular information may be sensitive, private, etc. and intended to be kept secure, e.g. not released to a non-secure domain).

In some examples, in addition to outputting the second image data comprising an obfuscation corresponding to the first portion, e.g. an obfuscated region corresponding to a determined location of the identified object, metadata may be output indicating that the obfuscated region is obfuscated in the second image data. In examples, the metadata may be included as part of the second image data. In other examples, the metadata may be output separately. For example, the metadata may indicate that the obfuscation in the second image data can be ignored during further processing. For example, as described, the second image data may be further processed in the non-secure domain, e.g. to identify objects belonging to at least one other predetermined classes of objects. The data, e.g. metadata, indicating that the further processing may account for, e.g. ignore, the obfuscation can reduce a likelihood of error in the further processing. For example, in the case where the predetermined class of objects corresponds to children's faces, the second image data output by the object identification system may include an obfuscation of the image data corresponding to a location of a child's face in the image. Thus, if the second image data were to be further processed in the non-secure domain, e.g. to identify people and locate them in the image, the child with an obfuscated face may not be identified due to the obfuscation. Therefore, the metadata may indicate that the obfuscation (e.g. of the child's face) may be accounted for, e.g. the obfuscated region may not be processed, such that the likelihood of not identifying the child is reduced (or the likelihood of identifying the child nonetheless is increased) compared to processing the second image data without accounting for the obfuscation therein. Furthermore, the data, e.g. metadata, indicating that the further processing may account for, e.g. ignore, the obfuscation in the second image data can reduce a number of storage accesses and/or computations for the corresponding region(s) of the second image data.

In examples, data (e.g. metadata) may be output, in addition to the second image data, to indicate a location or region of interest. For example, a further object belonging to another class may be detected in the image by processing of the first image data. Metadata indicating a region of interest corresponding to a location of the detected further object in the image may therefore be output in addition to the second image data. In examples where the non-secure second image data is further processed, e.g. by a further neural network in a non-secure environment, this may allow the further processing to focus on the region of interest. For example, more storage accesses and/or computations may be performed in relation to the region of interest than the rest of the image.

In certain cases, it is an authenticity of information associated with a certain type of object which is to be kept secure, as described above. For example, returning to the example in which the predetermined class of objects relates to traffic signs, or particularly speed limit signs, the first portion may correspond with alphanumeric characters on the traffic signs which contain speed limit information. Thus, image data derived from the second portion which is classified as to not be secured using the at least one security feature, e.g. due to having been determined to not contain the traffic sign identified in the image, is outputted as non-secure data in accordance with item 105 of the image processing method 100. The first portion may be obfuscated and outputted as part of the non-secure image data, e.g. in a modified version of the image, as described in examples. In other examples, the first portion may not be output as part of the non-secure image data—for example, the second image data may not comprise image data corresponding to the first potion classified as image data to be secured. Thus, the information associated with the identified object, e.g. the speed limit information, may not be outputted as part of the second image data and so not released from the secure environment. In this way, the outputted image data can be further used, e.g. processed, without the speed limit information being modified, such that the authenticity thereof is maintained.

In some examples, the first image data, e.g. obtained at item 101 of the method 100, is written to secure storage. For example, the original captured image (or feature data derived therefrom) may be stored securely in addition to outputting a modified version of the image (or feature maps) as non-secure image data. Thus, the authentic information associated with the original image may continue to be accessible to the object identification system, or a computing device that the object identification system is coupled to or part of. For example, the said computing device may be an on-board device coupled to or mounted within a road vehicle, e.g. a car, and the predetermined class of objects may be speed limit signs, as described in examples. Therefore, the second image data outputted by the object identification system as non-secure data may be further processed within the computing device, or transmitted thereby to an external device, and further information associated with the image may be obtained, e.g. an instance of an object belonging to a further class of objects. The further information may be used by the computing device, e.g. to display to a passenger of the road vehicle. The computing device may additionally or alternatively access the authentic speed limit information from the securely stored first image data, e.g. which information as part of the first portion may have been obfuscated or not outputted at all in the second image data. The authentic speed limit information may be used by the computing device, for example, to cause control of a speed of the road vehicle. In other examples, the computing device may display the authentic speed limit information, or a corresponding alert message, within the vehicle, e.g. on a dashboard display.

In examples, the first image data is encrypted, e.g. when written to secure storage or transferred between components within the secure environment. For example, an encryption scheme may be implemented such that the first image data is encrypted before being stored or transferred. The first image data may be encrypted by applying an encryption algorithm thereto. In some examples, a hash function (e.g. a cryptographic hash function) may be applied to the first image data. Encrypting and/or hashing the first image data may ensure that the first image data has not been tampered with when it is obtained, e.g. for further processing. Encryption and/or hashing may be applied to any data outputted from the secure environment, e.g. by the object identification system, to similarly ensure that the outputted data (e.g. the non-secure second image data) has not been modified prior to receipt by an external device.

Figure 2:
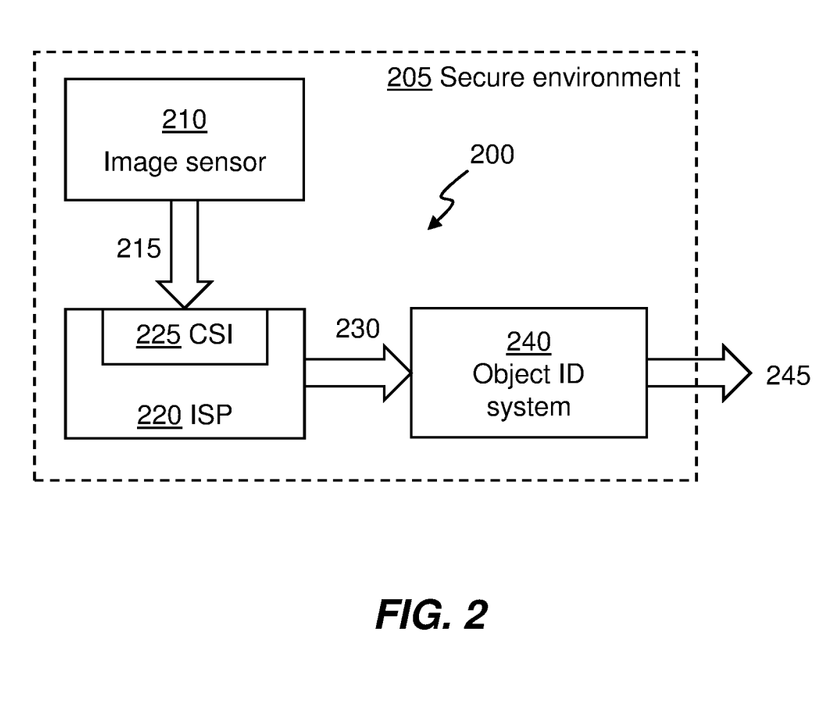
FIG. 2 shows schematically an example image processing system including an object identification system for use with the image processing methods described herein.

FIG. 2 schematically shows an object identification system 240, for use with the image processing methods 100 described herein, as part of an image processing system 200. The image processing system 200 of FIG. 2 may be coupled to, or form part of, a computer device such as a personal computer, a laptop, a smartphone or an on-board computer device which may be coupled to or mounted within a vehicle such as a car.

The image processing system 200 includes an image sensor 210. An image sensor typically includes an array of sensor pixels, which may be any suitable photosensors for capturing images. For example, a typical sensor pixel includes a photosensitive element such as a photodiode that can convert incident light into electronic signals or data. The sensor pixel may for example be a charge-coupled device (CCD) or a complementary metal-oxide-semiconductor (CMOS). The image sensor 210 in this example is arranged to capture image data representative of an image. The image may form part of a video, which is typically a series of images captured sequentially. For example, the image may correspond to a frame of a video.

In FIG. 2, the image sensor 210 is arranged to transfer image data 215 to an image signal processor (ISP) 220 of the image processing system 200 via a camera serial interface (CSI) 225. The ISP 220 may perform initial processing of the image data 215 to prepare the image data for display. For example, the ISP 220 may perform saturation correction, renormalization, white balance adjustment and/or demosaicing, although this is not to be taken as limiting. The ISP 220 may be secure, e.g. located within the secure environment 205 as shown in FIG. 2. Intermediate data generated by the ISP 220, e.g. based on the image data 215 transferred thereto, and image data 230 output by the ISP may be secure. For example, components without appropriate access rights may not access such secured intermediated data and/or output image data 230.

The object identification system 240 of FIG. 2 is arranged to receive image data 230, which may be a processed version of the image data 215 output by the image sensor 210, from the ISP 220. In other examples though, the object identification system 240 may receive the image data 215 directly from the image sensor 210. For example, the object identification system 240 may include a processor for performing initial processing of the image data 215 transferred from the image sensor 210. In further examples, the object identification system 240 may receive the image data 215 from a video decoder (e.g. implemented as part of a video conferencing system). For example, the image data 215 may correspond to one or more frames of a video.

As described above, the object identification system 240 comprises a neural network. The neural network may be used to process the image data, e.g. first image data 230, received by the object identification system 240. The object identification system 240 may then output second image data 245, e.g. in accordance with item 105 of the method 100 described above. An example of a neural network 300 is shown schematically in FIG. 3.

Figure 3:
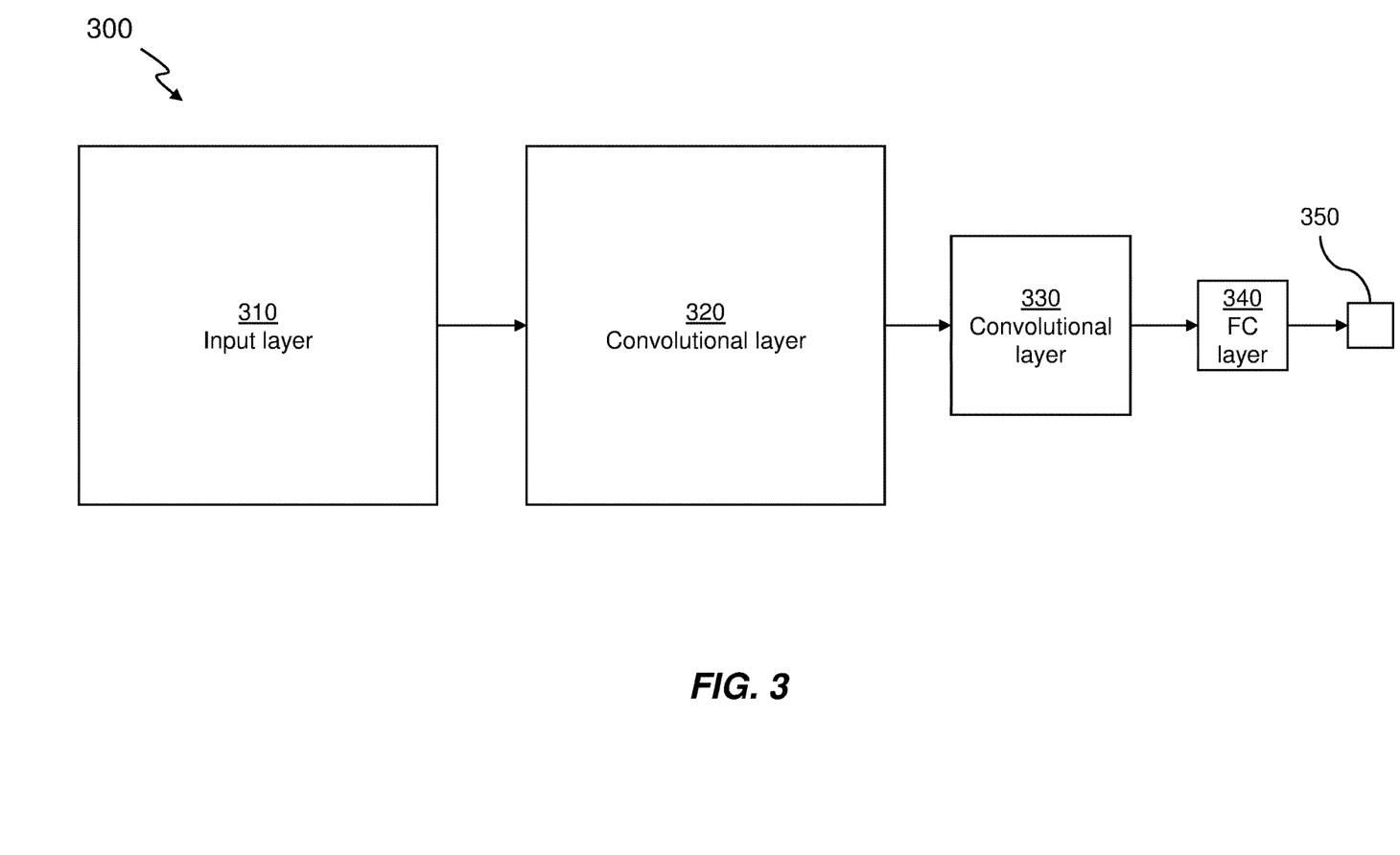
FIG. 3 shows schematically a convolutional neural network according to examples.

The neural network 300 includes a number of different layers 310, 320, 330, 340, 350. In FIG. 3, the neural network 300 is a convolutional neural network (CNN). An example of a CNN is the VGG-16 CNN, although other CNNs may be used instead. A typical CNN includes an input layer 310, a plurality of convolutional layers (two of which, 320, 330, are shown in FIG. 3), a number of fully connected layers (one of which, 340, is shown in FIG. 3) and an output layer 350. The input layer 310 for example corresponds with an input to the neural network 300, which in this example is image data.

The image data is for example 224 pixels wide and 224 pixels high and includes 3 colour channels (such as a red, green and blue colour channel). The convolutional layers typically extract particular features from the input data, to create feature maps, and may operate on small portions of an image. The fully connected layers then use the feature maps for classification.

In the example of FIG. 3, the output of the second layer 320 undergoes pooling before it is input to the third layer 330. Pooling for example allows values for a region of an image or a feature map to be aggregated or combined, for example by taking the highest value within a region. For example, with 2×2 max pooling, the highest value of the output of the second layer 320 within a 2×2 patch of the feature map output from the second layer 320 is used as an input to the third layer 330, rather than transferring the entire output of the second layer 320 to the third layer 330. This reduces the amount of computation for subsequent layers of the neural network 300. This is shown schematically in FIG. 3 as a reduction in size of the third layer 330 compared to the second layer 340. Further pooling is performed between the third and fourth layers 330, 340 and between the fourth and fifth layers 340, 350. It is to be appreciated that the neural network 300 of FIG. 3 has been greatly simplified for ease of illustration and that typical neural networks may be significantly more complex.

In general, neural networks such as the neural network 300 of FIG. 3 may undergo what is referred to as a "training phase", in which the neural network is trained for a particular purpose. As described, a neural network typically includes a number of interconnected neurons forming a directed, weighted graph in which vertices (corresponding to neurons) or edges (corresponding to connections) of the graph are associated with weights, respectively. The weights may be adjusted throughout training, altering the output of individual neurons and hence of the neural network as a whole. In a CNN, a fully connected layer typically connects every neuron in one layer to every neuron in another layer, and may therefore be used to identify overall characteristics of an image, such as whether the image includes an object of a particular class, or a particular instance belonging to the particular class.

In the example of FIG. 3, the neural network 300 has been trained to perform object identification by processing image data, for example to determine whether an object of a predetermined class of objects is present in the image represented by the image data (although in other examples the neural network 300 may have been trained to identify other image characteristics of the image instead). Training the neural network 300 in this way for example generates one or more kernels associated with at least some of the layers (such as layers of the neural network 300 other than the input layer 310 and the output layer 350). Hence, the output of the training may be a plurality of kernels associated with a predetermined neural network architecture (for example with different kernels being associated with different respective layers of a multi-layer neural network architecture). The kernel data may be considered to correspond to weight data representative of weights to be applied to image data, as each element of a kernel may be considered to correspond to a weight, respectively. Each of these weights may be multiplied by a corresponding pixel value of an image patch, to convolve the kernel with the image patch as described below.

The kernels may allow features of an image to be identified. For example, some of the kernels may be used to identify edges in the image represented by the image data and others may be used to identify horizontal or vertical features in the image (although this is not limiting, and other kernels are possible). The precise features that the kernels identify may depend on the image characteristics, such as the class of objects, that the neural network 300 is trained to detect. The kernels may be of any size. As an example, each kernel may be a 3×3 matrix, which may be convolved with the image data with a stride of 1. The kernels may be convolved with an image patch (or a feature map obtained by convolution of a kernel with an image patch) to identify the feature the kernel is designed to detect. Convolution generally involves multiplying each pixel of an image patch (in this example a 3×3 image patch), or each element of a feature map, by a weight in the kernel before adding the result of this operation to the result of the same operation applied to neighbouring pixels or neighbouring feature map elements. A stride for example refers to the number of pixels or feature map elements a kernel is moved by between each operation. A stride of 1 therefore indicates that, after calculating the convolution for a given 3×3 image patch, the kernel is slid across the image by 1 pixel and the convolution is calculated for a subsequent image patch. This process may be repeated until the kernel has been convolved with the entirety of the image (or the entire portion of the image for which a convolution is to be calculated), or with the entirety of a feature map the kernel is to be convolved with. A kernel may sometimes be referred to as a filter kernel or a filter. A convolution generally involves a multiplication operation and an addition operation (sometimes referred to as a multiply-accumulate operation). Thus, a processor or neural network accelerator configured to implement a neural network, such as that of FIG. 4, may include a multiplier-accumulator (MAC) unit configured to perform these operations.

After the training phase, the neural network 300 (which may be referred to as a trained neural network 300) may be used to detect the presence of objects of a predetermined class of objects in input images. This process may be referred to as "classification" or "inference". Classification typically involves convolution of the kernels obtained during the training phase with image patches of the image input to the neural network 300 to generate a feature map. The feature map may then be processed using at least one fully connected layer to classify the image.

In the example of FIG. 3, the second layer 320 involves the convolution of 64 different kernels with the image data of the input layer 310. Each of the 64 kernels is, for example, arranged to identify a different respective feature of the image data. In an illustrative example in which the image data is 224×224 pixels in size, with 3 colour channels, and is convolved with 64 kernels of a size of 3×3 pixels, the layer 104a of the neural network 300 involves 224×224×3×(3×3)×64 multiply-accumulate operations, i.e. 86 million multiply-accumulate operations. There will also be a large number of further multiply-accumulate operations associated with each of the third and fourth layers 330, 340 of the neural network 300, which involve convolving the output of the previous layer with 256 kernels and 512 kernels respectively in this example, in which the neural network 300 is the VGG-16 convolutional neural network. As will be appreciated, though, other neural networks may involve convolutions with a different number of kernels. Nevertheless, processing an image to identify an image characteristic such as the presence of an object of a predetermined class, or a particular instance of the object, typically involves a large number of data processing operations, each of which consumes power.

In the example of FIG. 3, image data received by the input layer 310 of the neural network 300 is processed using layers 320, 330, 340 to generate feature data. The image data may represent at least one characteristic of the light captured by an image sensor, such as an intensity of the light captured by each sensor pixel, which may be proportional to the number of photons captured by that sensor pixel. The intensity may represent a luminance of the captured light, which is for example a measure of the intensity of light per unit area rather than an absolute intensity. In other examples, the image data may be representative of a brightness of captured light, which may be considered to correspond to a perception of a luminance, which may or may not be proportional to the luminance. In general, the image data may represent any photometric quantity or characteristic that may be used to represent the visual appearance of the image represented by the image data, or may be derived from any such photometric quantity or characteristic. The image data may be in any suitable format, such as a raw image format. For example, the image data may be streamed from the image sensor, with or without being saved to a framebuffer, without saving the raw image data to memory. In such cases, image data obtained after processing of the raw image data may, however, be written to memory.

In this example, the layers 320, 330, 340 of the neural network 300 may be used to generate feature data representative of at least one feature of the image. The feature data may represent an output feature map, which may be output from a convolutional layer of a CNN such as the neural network 300 of FIG. 3. There may be more or fewer layers in the neural network 300 than those shown in FIG. 3. In examples in which the neural network 300 includes a plurality of layers 320, 330 between the input layer 310 and the fully connected layer 340 and/or the output layer 350, as shown in FIG. 3, each of the said plurality of layers 320, 330 may be used to generate intermediate feature data representative of at least one feature of the image. The intermediate feature data output from one of the layers (e.g. layer 320) may be input to a subsequent layer of the neural network 300 (e.g. layer 330) to identify further features of the image represented by the image data input to the neural network 300.

Although not shown in FIG. 3, it is to be appreciated that further processing may be applied to the image data after it has been obtained by an image sensor and before it is processed by the layers of the neural network 300. Said further processing may be performed by other components of an image processing system or as part of the neural network 300 itself.

In examples in which the neural network 300 is a CNN, as in FIG. 3, at least one layer of the neural network 300 (in this example, each of the layers 320, 330) may be a convolutional layer, respectively. The neural network 300 also includes a fully connected layer 340, which in FIG. 3 is arranged to receive output feature data from the convolutional layer 330, which for example represents an output feature map, and to process the output feature data to generate object data. The object data for example corresponds with the output layer 350 of the neural network 300. The object data generated by the fully connected layer 340 may provide an indication of whether the neural network 300 has detected an object of a predetermined class in the image associated with the image data. In FIG. 3, the neural network 300 includes solely one fully connected layer 340. However, in other examples, the neural network 300 may include a plurality of fully connected layers, with an output of one of the fully connected layers being received as an input by a subsequent fully connected layer.

Returning to FIG. 2, the object identification system 240 includes at least one processor. For example, the object identification system 240 may include a central processor unit (CPU). In other examples, though, the object identification system 240 may include other or alternative processors such as a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. The object identification system 240 may also or alternatively include a processor implemented as a combination of computing devices, e.g. a combination of a DSP and a microprocessor, a plurality of microprocessors, one or more microprocessors in conjunction with a DSP core, or any other such configuration. The object identification system 240 may also or alternatively include at least one graphics processing unit (GPU). The neural network 300 of FIG. 3 may be implemented by one or more of these processors in examples.

In certain cases, the object identification system 240 of FIG. 2 may additionally or alternatively include at least one neural network accelerator. A neural network accelerator is, for example, a processor dedicated to implementing at least classification of data using a neural network. The at least one neural network accelerator may be configured to implement a neural network in accordance with the neural network examples described above, e.g. the neural network 300 of FIG. 3. The at least one neural network accelerator may be a neural network accelerator (such as a single or sole neural network accelerator) configured to implement a plurality of neural networks, including the example neural network 300 described above, in some examples. In other examples, in which the object identification system 240 is to implement a plurality of neural networks, each neural network may be implemented by a corresponding neural network accelerator.

In examples, the at least one processor (e.g. neural network accelerator, GPU, CPU, and/or DSP) of the object detection system 240, configured to implement the neural network 300, may support a single security domain. For example, the at least one processor may remain in the secure environment 205. In such cases, the object detection system 240 may comprise a further at least one processor to obtain the second image data 245, e.g. to perform further processing thereon. The further at least one processor may remain outside the secure environment 205, e.g. in a non-secure domain. For example, the object detection system 240 may be partitioned, such that a secure partition remains within the secure environment 205 and a non-secure partition remains outside the secure environment 205). In certain cases, one or more individual processors of the object detection system 240 may be partitioned into respective secure and non-secure partitions. In other examples, the at least one processor configured to implement the neural network 300 of the object detection system may be switchable between a secure domain (e.g. the secure environment 205) and a non-secure domain (e.g. outside the secure environment 205), as described in examples herein.

Figure 4:
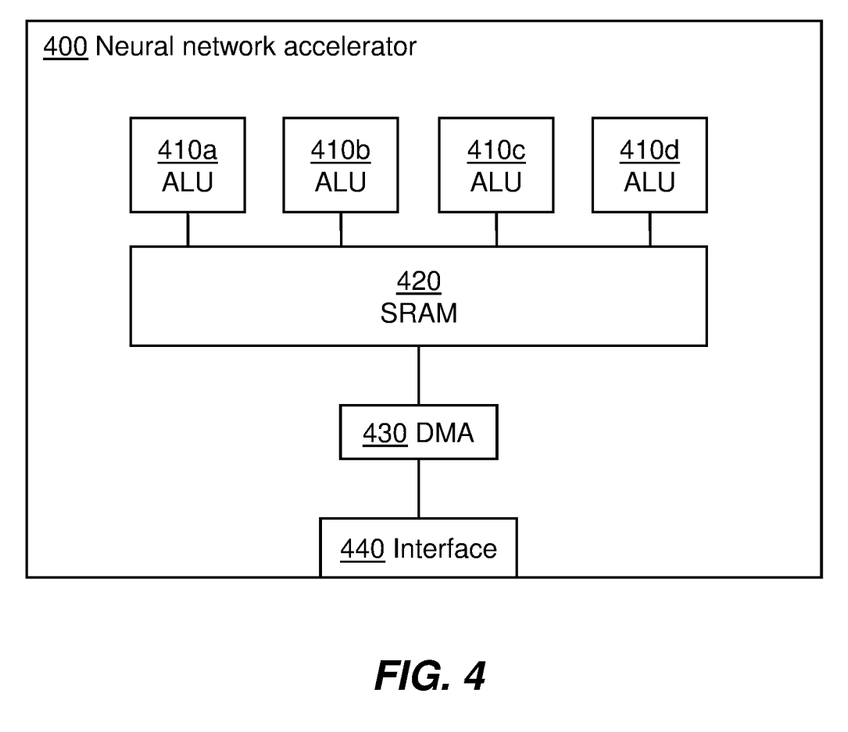
FIG. 4 shows schematically an example neural network accelerator.

Internal components of an example neural network accelerator are shown schematically in FIG. 4. The neural network accelerator 400 includes a plurality of ALUs 410*a*, 410*b*, 410*c*, 410*d*, collectively referred to with the reference numeral 410. The ALUs 410 are each arranged to perform a multiply-accumulate operation, for example in order to perform the convolutions discussed above. The ALUs 410 may also be arranged to each perform further operations, e.g. pooling and/or activation operations.

The neural network accelerator 400 includes an interface 440, via which inputs to the neural network 400 may be received, for example from other components of the object identification system 240, such as a driver of another processor, e.g. CPU, or storage. Each ALU 410 typically includes at least one MAC unit (generally an array of MAC units), although other ALUs are possible. In general, an ALU 410 may be considered to be any electronic circuit that may perform arithmetic and bitwise operations on binary numbers.

Examples of inputs which may be received by the neural network accelerator 400 via the interface 440 include image data representative of an image to be classified using the neural network and kernel data representative of a kernel associated with the neural network after training. For example, the neural network may be trained either by the object identification system 240 or by an external computer device or computer system, for example using a GPU. The output of the training may be a plurality of kernels associated with a predetermined neural network architecture (for example with different kernels being associated with different respective layers of a multi-layer neural network architecture). The kernel data may be considered to correspond to weight data representative of weights to be applied to image data, as each element of a kernel may be considered to correspond to a weight, respectively. Each of these weights may be multiplied by a corresponding pixel value of an image patch, as part of the convolution of the kernel with the image patch.

The neural network accelerator 400 of FIG. 4 also includes a direct memory access (DMA) 430 which may allow the neural network accelerator 400 to access storage of the object identification system 240 directly, e.g. independently of the CPU. This may improve the speed at which the neural network accelerator 400 is able to perform classification of input data. For example, the neural network accelerator 400 may access inputs, to be input to the classification process, directly from the storage (which may be main memory or system memory), without having to wait for the CPU to be available. For example, the image data, kernel data and/or parameter data may be stored in the storage of the object identification system 240 and retrieved from the storage by the neural network accelerator 400.

The neural network accelerator 400 includes static random access memory (SRAM) 420, which may be used to store inputs to the classification process implemented by the ALUs 410. For example, the SRAM 420 may be on-chip or local memory of the neural network accelerator 400, which is generally quicker to access than the storage of the object identification system 240. The SRAM 420 may include a plurality of separate storage areas. For example, the image data may be stored in a different storage area from the kernel data (although, in some cases, they may be stored in the same storage area).

The object identification system 240 of FIG. 2, comprising a neural network as described, may perform secure image processing operations, e.g. including one or more of the items 101-105 of the image processing method 100 described above with reference to FIG. 1. In some examples, the object identification system has a secure mode, in which the object identification system is configured to perform the secure image processing operations, and also a non-secure mode, in which the object identification system is configured to perform non-secure image processing operations. For example, the object identification system 240 may be switched between the secure and non-secure modes, e.g. by a controller. In certain cases, the secure and non-secure modes of the object identification system 240 may respectively correspond with secure and non-secure modes of the at least one processor of the object identification system 240. Intermediate data generated by the object identification system 240 (e.g. the at least one processor), when performing secure image processing operations, may be secure. For example, the at least one security feature may be applied to such intermediate data, e.g. to restrict access thereto by other components.

When in the secure mode, the at least one processor (e.g. neural network accelerator) may have particular storage access restrictions. This can ensure that operation of neural network accelerator will not cause a risk of leakage of secure data out of the secure domain, e.g. to an operating system implemented on a host processor (CPU) of the object identification system.

In one embodiment, the at least one processor (e.g. neural network accelerator) as a whole is switched between the non-secure mode and the secure mode of operation (i.e. the at least one processor is at any one time either only doing non-secure processing or only secure processing). This can avoid the need for a complex implementation of security internally in the accelerator.

In another embodiment, the switching between the secure and non-secure modes is done on an address space basis, such that the at least one processor may concurrently perform both secure and non-secure processing (operations). In this case, the mode switching may be performed using trusted firmware.

The switching process may ensure that there is no state (e.g. data, etc.) in the object detection system (e.g. stored in storage thereof) from the secure mode of operation that remains once the object detection system (e.g. the neural network accelerator) has been switched to its non-secure mode of operation. This helps reduce a likelihood of data leakage from the secure domain to the non-secure domain. Thus, in an embodiment, the process of switching the object detection system from its secure mode to its non-secure mode of operation comprises clearing (e.g. triggers the clearing of) any stored data (e.g. caches, registers, etc. that store data) from the secure operation. The reverse switch, from the non-secure to the secure mode, may not involve clearing the internal state of the accelerator.

Switching between modes may be carried out in any suitable manner, but in an example is carried out by one (or more) of: using trusted firmware to control the switching; using open firmware in conjunction with trusted host software for the switching; fully through trusted software; or using a hardware implemented mechanism (e.g. where the object identification system has a hardware internal state clearing mechanism that could be triggered when switching from the secure mode to the non-secure mode of operation).

Where trusted firmware is used to control the switching, a (trusted) microcontroller (MCU) may be used to schedule transitions between non-secure and secure mode processing. This may be implemented as part of the neural network accelerator (sub)system, for example. Other ways of controlling the switching may be used, though. For example, in one case a hardware mechanism is used to control the switching of the object detection system from the secure mode to the non-secure mode and vice-versa. In this case, there may be a hardware mechanism that can be used to set the object detection system (e.g. the neural network accelerator) in its secure processing mode (and/or in its non-secure processing mode).

The image sensor 210 and the ISP 220 may form a secure subsystem within the secure environment 205. Thus, when the object identification system 240 is switched into the secure mode, the secure environment 205 may be extended to include the object identification system 240. In other examples, the entire image processing system 200, e.g. comprising the image sensor 210, the ISP 220 and the object identification system 240, may be switchable between secure and non-secure (e.g. "normal") modes. For example, as described above with reference to the at least one processor of the object identification system 240, the image sensor 210 and the ISP 220 of the image processing system 200 may switch between a non-secure mode and a secure mode, e.g. having different storage access capabilities in the different modes. For example, when in their respective secure modes the image sensor 210 and the ISP 220 may output image data to secure storage which is not accessible by the image sensor 210 and the ISP 220 (or any other component) when in their respective non-secure modes. This may allow information comprised in an image to not be released from the secure environment 205, even before the object associated with said information has been identified in the image. Thus, information which is to be secured may not be released from the secure environment 205, since the non-secure second image data 245 outputted by the object identification system 240 may not contain image data classified as image data to be secured (or may have such image data obfuscated). As described in examples above, the image processing system 200 may include additional or alternative components to the image sensor 210 and the ISP 220, such as a video decoder. The components of the image processing system 200 may be switchable between secure and non-secure modes in certain cases. In other cases, the components may be secure components (e.g. permanently operating in the secure environment 205) configured to generate secure intermediate data and to output secure data. Alternatively there may be a mix of secure and switchable components, for example an ISP 220 or video decoder that is permanently secure arranged to output data to an object identification system 240 that is switchable between secure and non-secure modes.

As described previously with reference to item 105 of FIG. 1, the object identification system 240 may be configured to output the second image data, derived from at least the second portion of the first image data, as non-secure image data. This output operation is one of the secure image processing operations performable by the object identification system 240. Thus, in examples in which the object identification system 240 is switchable between secure and non-secure modes, the output operation (item 105) is performable by the object identification system 240 when in the secure mode. In some examples, the object identification system 240 may be configured to, when in the non-secure mode, obtain the second image data and perform non-secure image processing operations thereon. For example, in addition or in the alternative to outputting the second image data when the object identification system 240 is in the secure mode, e.g. to an external computer system for further processing, the object identification system 240 may instead be switched into the non-secure mode to further process the second image data. For example the at least one neural network of the object identification system 240 may be used in the non-secure mode to process the second image data, e.g. to determine whether the image corresponding to the second image data comprises an object belonging to a further class of objects different to the predetermined class of objects.

In some examples, the second image data is transferred to a further neural network in a non-secure environment as part of the outputting the second image data as non-secure image data. For example, the further neural network may be part of a further image processing system configured to receive the second image data, e.g. as a modified version of the first image data with the first portion obfuscated, and to process the second image data. The further neural network may have a structure similar to, or the same as, that of the neural network of the object identification system. For example, the neural network and the further neural network may comprise a single neural network in respective secure and non-secure operational modes, as described above with reference to the object identification system being switchable between secure and non-secure modes. In other examples, the further neural network is a separate neural network, e.g. which may have been trained separately for different image processing operations.

In examples, the second image data is processed using at least one layer of the further neural network to identify a further object in the image. For example, the further neural network may have a structure similar to the example neural network 300 shown in FIG. 3. The further neural network may receive the second image data at an input layer, and process the second image data using one or more further layers. For example the further neural network may process the second image data using at least one convolutional layer to generate feature data, e.g. one or more feature maps. The output of each layer of the further neural network may be fed as input to a respective subsequent layer of the further neural network. The further neural network may include at least one fully connected layer arranged to use the generated feature data, e.g. feature maps, for object classification (as described previously).

In some examples, the second image data outputted as non-secure image data (at item 105) comprises feature data, e.g. generated by a layer of the neural network arranged to process the first image data to identify an object in the associated image (item 102). For example, referring to the example neural network 300 of FIG. 3, the fully connected layer 340 is arranged to receive and process output feature data from the convolutional layer 330 to generate object data (e.g. corresponding with the output layer 350) which may provide an indication of whether the neural network 300 has detected an object of a predetermined class in the image associated with the first image data. The second image data derived from at least the second portion of the first image data (the second portion being classified, in response to determining that the image includes an object belonging to the predetermined class of objects, as image data to which the at least one security feature is not to be applied) may comprise feature data generated by an intermediate layer 320, 330 of the neural network 300. As described, the second image data (e.g. comprising feature data) is derived from at least the second portion of the first image data.

In certain cases, one or more initial layers of the neural network 300 may correspond to one or more initial layers of the further neural network, e.g. to which the non-secure second image data may be transferred for further processing. For example, neural networks trained to detect or identify different image features or characteristics (e.g. different specific features and/or objects) nevertheless tend to have very similar or identical initial layers. For example, the initial layers of a neural network may identify more general image features, which may be present in images of a wide range of different scenes or objects. As an illustrative example, if one neural network is trained to identify cars in images and a different neural network is trained to identify cats in images, these neural networks may nevertheless share similar or identical initial layers, which identify general image features such as edges, corners, or ridges in the images. Subsequent layers in these neural networks may be different, however, in order to perform a higher level determination of whether lower-level image features correspond to a particular class of object (e.g. a car or a cat), depending on what the neural network has been trained to detect. This principle may be applied in examples described herein to reduce processing in object identification methods and systems. For example, the initial layers of each of the neural networks may be used to extract the same higher level features from input image data as each other.

Due to this overlap in function of the initial layers of the two neural networks, the one or more initial layers of the further neural network may be bypassed. For example, the second image data comprising feature data, e.g. an Output Feature Map (OFM), may be transferred from the original neural network 300 to a layer of the further neural network subsequent to the one or more initial layers thereof, e.g. without transferring the feature data to the one or more initial layers thereof. In examples, the second image data, e.g. the feature data output from the layer 320, is written to (non-secure) storage and is subsequently retrieved from the storage by a layer of the further neural network subsequent to the one or more initial layers thereof.

With this approach, rather than redoing the same initial processing as performed by the one or more initial layers of the neural network, the further neural network may instead read the feature data output from the initial layers of the neural network 300 (e.g. from storage or via direct transfer of the feature data), which is more efficient and may reduce the amount of processing performed by the further neural network. In some examples, the one or more initial layers of the further neural network (corresponding to those of the neural network 300) may be omitted when the further neural network is used for classification. For example, the further neural network may be trained so that the one or more initial layers thereof correspond to the one or more initial layers of the neural network 300. However, the one or more initial layers may not necessarily be present in a processor or other system arranged to implement the further neural network. For example, such a processor or system may not include or access weight data corresponding to weights associated with the one or more initial layers during implementation of the further neural network for classification.

In some examples in which the second image data comprises feature data, the second image data may not include feature data corresponding to the first portion. For example, feature data corresponding to the first portion, classified as image data to be secured, may not be output as part of the non-secure image data. In other examples, the second image data may include feature data corresponding to the first portion wherein the first portion is obfuscated. For example, returning to the credit card example, the second image data comprising feature data may include an obfuscated region corresponding to an identified credit card. The feature map, generated during the processing to identify the credit card in the associated image, may have an obfuscated region corresponding to a determined location of the credit card in the feature map, for example. The obfuscation may include at least one of blurring, obscuring, and redacting as previously described, for example.

In certain examples, the second image data includes feature data (e.g. a feature map) in accordance with the examples above as well as image data corresponding to a modified version of the image. For example, the second image data may comprise a feature map and a modified image in which the first portion is obfuscated in both the feature map and the image. A processor, e.g. neural network accelerator, configured to process the second image data may then select the feature map or modified image as an input. For example, the second image data may be output to multiple processors, some of which are configured to process feature maps as input data, and others configured to process images as input data. Therefore, a given processor may select the feature map or the modified image as input data, as appropriate for the given processor.

In the same way that the further neural network may obtain feature data, outputted as the second image data, for processing—in some examples, the first image data associated with an image and obtained by the neural network 300 for processing may comprise first feature data representative of at least one feature of the image. For example, raw image data representative of the image may have been processed, e.g. by a different neural network, to generate the first feature data (and optionally pre-processed) prior to being obtained as the first image data by the object identification system. Thus, the second image data may comprise second feature data, representative of at least one feature of the image (and derived from the second portion of the first image data using the neural network 300) in examples.

As previously described, classifying the first portion of the first image data as image data to be secured with at least one security feature may involve determining a location of the identified object in the image associated with the first image data. In some examples, determining the location of the identified object in the image may involve processing, using a de-convolutional neural network, object data output by the neural network during the processing the first image data to identify the object in the image. As described, the object data (e.g. generated by the fully connected layer 340 of the neural network 300) may provide an indication of whether an object of the predetermined class has been detected in the image associated with the first image data.

A deconvolutional neural network—a type of neural network also known as a "deconvolutional network" or a "transposed convolutional neural network"—may be considered to be an inverse convolutional neural network, e.g. a neural network arranged to perform an inverse convolutional model. An example of a deconvolutional neural network is shown schematically in FIG. 5.

The deconvolutional neural network 500 includes an input layer 510, e.g. which corresponds with an input to the deconvolutional neural network 500. In this example, the input to the deconvolutional neural network 500 comprises object data output by the convolutional neural network 300 shown in FIG. 5 which corresponds to the neural network 300 of FIG. 3 described above—the corresponding description applies accordingly.

Figure 5:
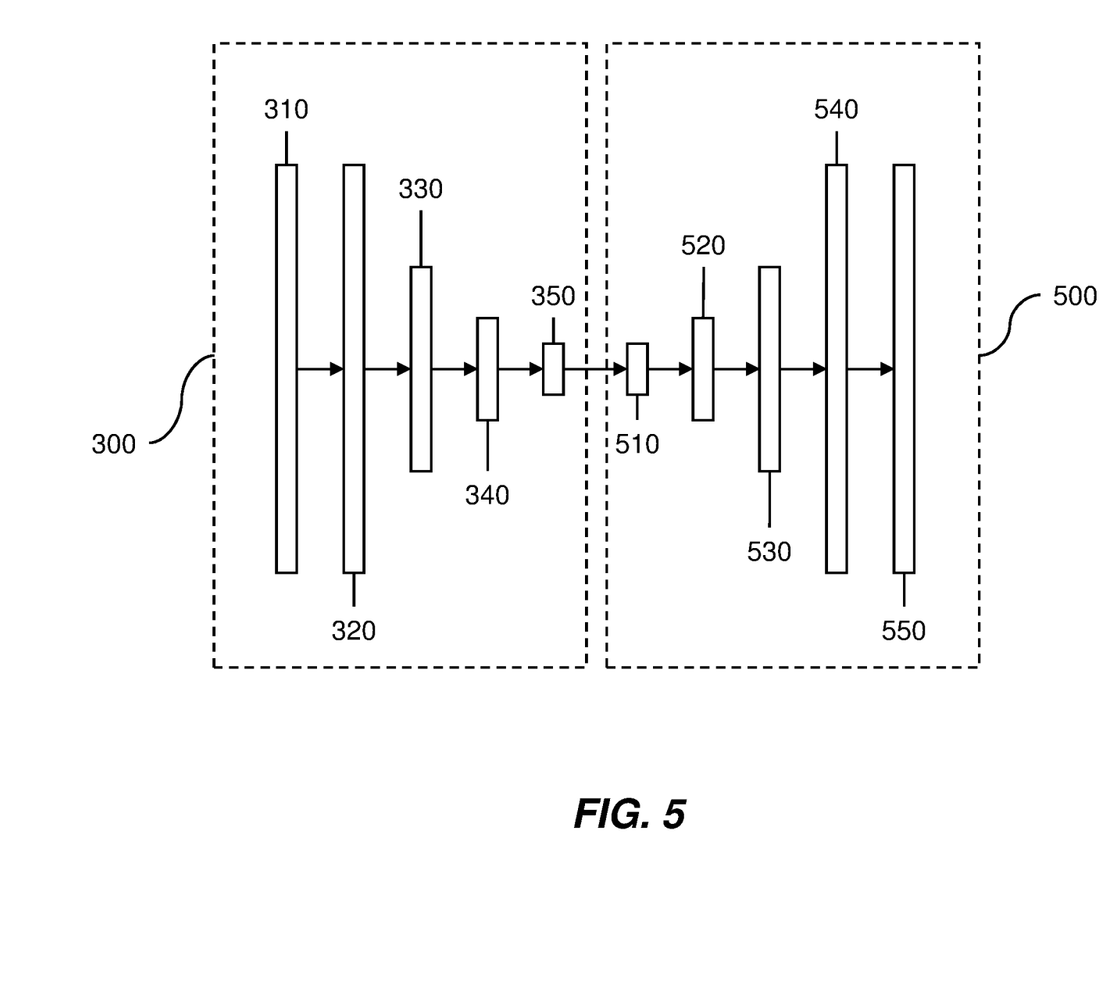
FIG. 5 shows schematically the convolutional neural network of FIG. 3 coupled to an example deconvolutional neural network, according to examples.

The deconvolutional neural network 500 also includes a fully connected layer 520, deconvolutional layers 530, 540 and an output layer 550. In the example of FIG. 5, the output of the input layer 510 undergoes unpooling before it is input to the second layer 520. Unpooling for example operates to substantially reverse the pooling applied by the convolutional neural network 300. For example, unpooling may allow previously aggregated or combined values for a region of an image or a feature map to be uncombined. This unpooling is shown schematically in FIG. 5 as an increase in size of the second layer 520 compared to the input layer 510. Further pooling is performed between the second and third layers 520, 530 and between the third and fourth layers 530, 540. It is to be appreciated that the deconvolutional neural network 500 of FIG. 5 has been greatly simplified for ease of illustration and that typical deconvolutional neural networks may be significantly more complex.

A deconvolutional neural network may be trained, as described previously, for a particular purpose. Weights associated with neurons, or connections between neurons, of the deconvolutional neural network may be adjusted throughout training, altering the output of individual neurons and hence of the neural network as a whole. In the example of FIG. 5, the deconvolutional neural network 500 has been trained to determine a location of an identified object in an image based on obtained object data associated with the image. Kernels may be deconvolved with image data (e.g. object data, feature data) input to a layer of the deconvolutional neural network 500. For example, the deconvolutional layers 530, 540 are arranged to apply deconvolution operations on the data received thereby in order to localise the object identified by the convolutional neural network 300. The output layer 550 of the deconvolutional neural network 500 may correspond to a location, e.g. a region, of the image or feature map that is determined, e.g. estimated, to contain the identified object.

In the example of FIG. 5, the convolutional network 300 has a first plurality of layers 310-350, and the deconvolutional neural network 500 has a second plurality of layers 510-550 corresponding to the first plurality of layers. For example, at least some of the second plurality of layers 510-550 may be derivable based on a corresponding layer of the first plurality of layers 310-350. For example, the deconvolutional layers 530, 540 may be transposed versions of the convolutional layers 330, 320, respectively. The deconvolutional neural network 500 may be considered to mirror the convolutional neural network 300 in its structure and/or processing. In other examples, the deconvolutional neural network 500 may comprise more or fewer layers than the convolutional neural network 300. In some examples, the deconvolutional neural network 500 may have a structure that is not based on that of the convolutional neural network 300.

In some examples, as previously described, the second image data outputted by the object identification system comprises feature data, e.g. a feature map, generated by a given convolutional layer 320, 330 of the convolutional neural network 300. In such cases, the deconvolutional neural network 500 may have layers corresponding to the given convolutional layer 320, 330 and subsequent layers 340, 350 of the convolutional neural network 300. For example, the second image data may comprise feature data, e.g. a feature map, generated by the third layer 330 of the convolutional neural network 300 and the deconvolutional neural network 500 may thus have layers 510, 520, 530 corresponding to the third layer 330 and subsequent layers 340, 350 of the convolutional neural network 300. The deconvolutional neural network 500 may not comprise layers corresponding to any layer 310, 320 of the convolutional neural network 300 prior to the given layer 330 in examples. Thus, the deconvolutional neural network 500 may deconvolve image data up to the layer corresponding to the feature map transferred as part of the second image data.

The above examples are to be understood as illustrative. Further examples are envisaged. For example, where image data is described in the examples described with reference to the Figures, e.g. as the obtained first sensed data, in other examples audio data representative of a sound may be used. For example, the first sensed data may comprise first audio data. In some examples, the first sensed data may comprise first feature data representative of at least one feature of the sound. For example, audio data may be processed using a neural network to generate feature maps representative of at least one feature of the sound, in a similar way to that described for image data. The classes of objects when processing audio data (using the neural network) may correspond to characteristics of the audio data such as a source of a sound, e.g. a particular person speaking or a kind of vehicle making a sound. Some classes may relate to particular aspects of speech, for example a language being spoken, a gender of the speaker, or the content of the speech, e.g. particular words or phrases.

As an example, the first sensed data may comprise audio data representative of a spoken utterance. For example, returning to the case where credit card information is to be kept secure, the utterance may include a credit card number. The audio data may thus be processed using the neural network to identify an object corresponding to the spoken credit card number and determine that the object belongs to the predetermined 'credit card number' class of objects. For example, the neural network may learn a format of credit card numbers as they are spoken (e.g. a string of sixteen digits spoken in groups of four) or may detect other objects which indicate the object belonging to the predetermined class (e.g. that a phrase object like "my credit card number is . . . " is often followed by a phrase object belonging to the credit card number class of objects). In response to the determining, a first portion of the audio data (e.g. including the credit card number object) is classified as data to be secured with a security feature, while a second portion of the audio data (e.g. the rest of the utterance) is classified as data to which the security feature is not to be applied. Audio data, derived from at least the second portion of the input audio data, is output as non-secure data.

In some examples, audio data corresponding to the first portion to be secured may not be output as part of the output audio data. In other examples, the first portion may be obfuscated in the output audio data (as described with reference to the image data examples. Obfuscating the first portion in the output audio data may involve distorting the first portion of the audio data such that the respective audio (e.g. corresponding to the identified object belonging to the predetermined class, such as a credit card number or a particular person speaking) is unintelligible when the output audio data is played. In examples, the first portion may be obfuscated by reducing an amplitude or volume of the first portion such that the corresponding audio is inaudible when the output audio data is played. In further examples, the first portion of the audio data may be obfuscated by masking or replacing the corresponding audio with another sound, e.g. a tone or white noise.

In some examples, another kind of digital signal processor may be used instead of, or in addition to, the image signal processor 220 of FIG. 2. For example, in cases in which the first sensed data comprises first audio data, an audio signal processor may be used. Similarly, references to a video decoder may be replaced by another type of decoder or codec, for example an audio codec in examples in which audio data is processed. The image sensor 210 may instead be, or be supplemented by, an audio sensor such as a microphone in alternative examples where audio data is processed as the first sensed data.

Other examples are also envisaged in which the first sensed data comprises more than one type of sensed data, e.g. both audio and image (or "visual") data. For example, the predetermined class of objects may correspond to a particular person. Audio and visual data (e.g. image data, video data) may be processed as the first sensed data to identify the particular person therein. For example, the person may be identified as appearing in an image of the first sensed data, and/or as speaking in the audio data of the first sensed data. The first portion classified as data to be secured may thus comprise a respective first portion of the audio data and/or a respective first portion of the image data. Therefore, in the examples in which the first portion is obfuscated in the non-secure output data, the audio data and/or the image data may comprise the obfuscated first portion. For example, the particular person may be obfuscated, e.g. removed or masked, in the output image data and/or the output audio data. In another example, the particular person may be blurred in the output image data (e.g. such that the person is unrecognisable) and the speech corresponding to the person may be distorted in the output audio data (e.g. such that the person is unrecognisable).

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

The invention claimed is:

1. A method of data processing for an object identification system comprising a neural network, the method comprising, in a secure environment:
   obtaining first sensed data representative of a physical quantity measured by a sensor;
   processing the first sensed data, using the neural network, to identify an object in the first sensed data;
   determining that the identified object belongs to a predetermined class of objects;
   in response to the determining, classifying a first portion of the first sensed data as data to be secured with at least one security feature, and a second portion of the first sensed data to which said at least one security feature is not to be applied;
   outputting second sensed data, derived from the first portion of the first sensed data and the second portion of the first sensed data as non-secure data for processing in the less secure environment, wherein data corresponding to the first portion of the first sensed data is obfuscated in the second sensed data; and
   outputting metadata indicating a location or region of interest in the second sensed data, as non-secure data for processing in the less secure environment.

2. The method according to claim 1, wherein the first sensed data comprises at least one of:
   first image data representative of an image; or
   first feature data representative of at least one feature of the image.

3. The method according to claim 1, wherein the first sensed data comprises at least one of:
   first audio data representative of a sound; or
   first feature data representative of at least one feature of the sound.

4. The method according to claim 1, wherein the second sensed data comprises at least one of:
   the second portion of the first sensed data; or
   a modified version of the first sensed data, wherein the first portion is obfuscated in the modified version.

5. The method according to claim 1, wherein the second sensed data comprises second feature data derived from the second portion of the first sensed data using the neural network.

6. The method according to claim 1, comprising outputting metadata indicating a location of the obfuscated first portion in the second sensed data.

7. The method according to claim 1, wherein outputting the second sensed data comprises at least one of:
   transferring the second sensed data to a further neural network in a non-secure environment; or
   writing the second sensed data to non-secure storage.

8. The method according to claim 7, further comprising processing the second sensed data using a layer of the further neural network to identify a further object in the sensed data.

9. The method according to claim 7, wherein the neural network and the further neural network comprise a single neural network in secure and non-secure operational modes, respectively.

10. The method according to claim 1, wherein the secure environment comprises a trusted execution environment.

11. The method according to claim 1, comprising writing the first sensed data to secure storage.

12. The method according to claim 1, wherein classifying the first portion of the first sensed data as data to be secured comprises:
    determining a location of the identified object in the first sensed data; and defining the first portion on the basis of the determined location.

13. The method according to claim 12, wherein the determining the location of the identified object in the first sensed data comprises processing, using a deconvolutional neural network, object data output by the neural network based on the processing the first sensed data to identify the object.

14. The method according to claim 13, wherein the neural network comprises a convolutional neural network having a first plurality of layers,
wherein the deconvolutional neural network comprises a second plurality of layers corresponding to the first plurality of layers.

15. The method according to claim 1, comprising:
processing the first sensed data, using the neural network, to identify a further object in the second portion of the first sensed data;
determining that the identified further object belongs to a further predetermined class of objects; and
outputting metadata indicating a location of the further object in the second sensed data.

16. An object identification system, comprising a neural network, configured to perform secure data processing operations including:
obtaining first sensed data representative of a physical quantity measured by a sensor;
processing the first sensed data, using a neural network, to identify an object in the first sensed data;
determining that the identified object belongs to a predetermined class of objects;
in response to the determining, classifying a first portion of the first sensed data as data to be secured with at least one security feature, and a second portion of the first sensed data to which said at least one security feature is not to be applied;
outputting second sensed data, derived from the first portion of the first sensed data and the second portion of the first sensed data as non-secure data for processing in the less secure environment, wherein data corresponding to the first portion of the first sensed data is obfuscated in the second sensed data; and
outputting metadata indicating a location or region of interest in the second sensed data, as non-secure data for processing in the less secure environment.

17. The object identification system according to claim 16, wherein the object identification system comprises:
a secure mode, in which the object identification system is configured to perform the secure data processing operations; and
a non-secure mode, in which the object identification system is configured to perform non-secure data processing operations.

18. The object identification system according to claim 17, wherein the object identification system is configured to, when in the non-secure mode, obtain the second sensed data and perform non-secure data processing operations thereon.

19. A data processing system comprising:
the object identification system according to claim 16; and
a component configured to perform secure data processing operations;
wherein the object identification system is arranged to receive the first sensed data from the component.

* * * * *